May 29, 1934. N. H. ABRAMS 1,960,568
METER YOKE
Filed Aug. 1, 1931
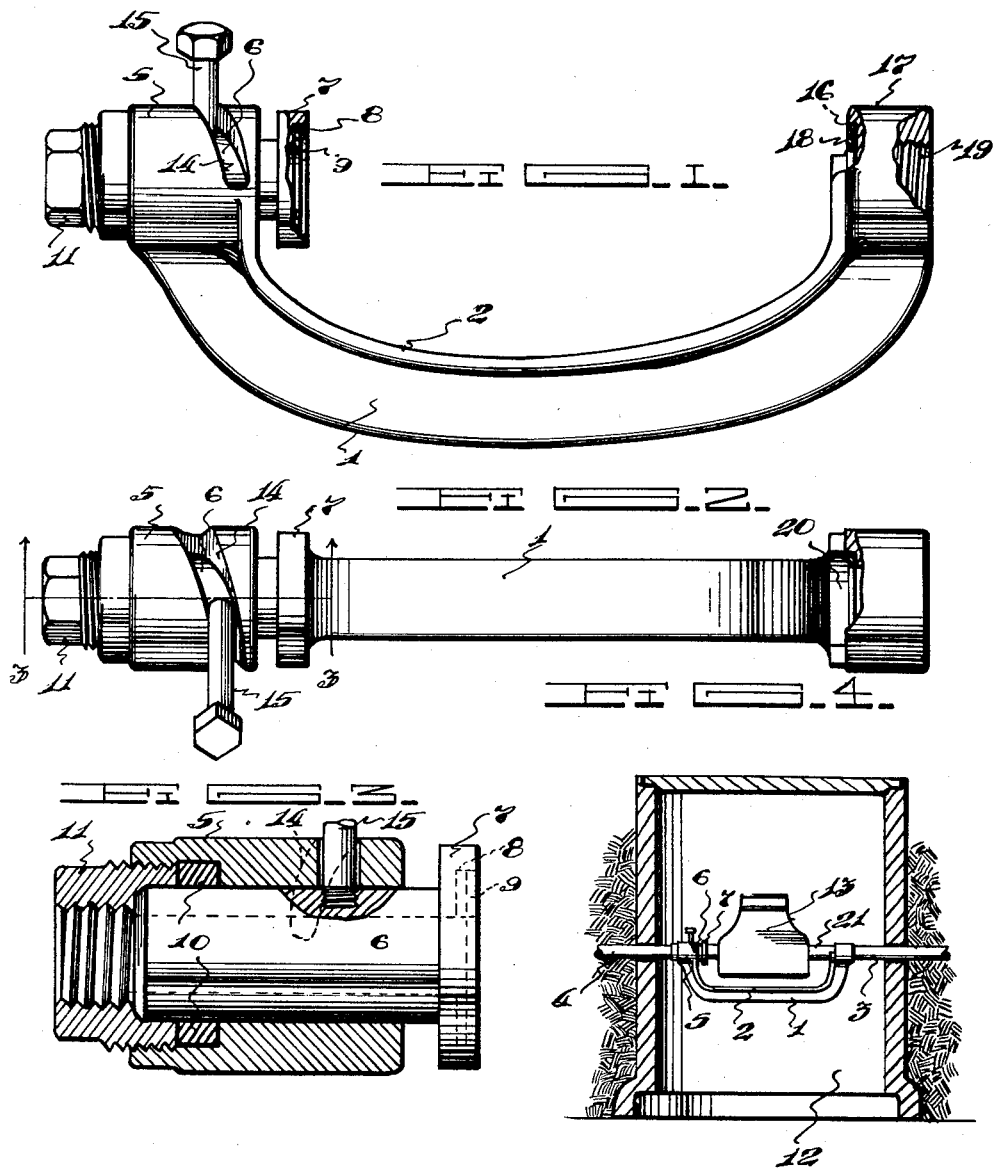
Norman H. Abrams
INVENTOR.
BY Ernest A. Ward
ATTORNEY.

Patented May 29, 1934

1,960,568

UNITED STATES PATENT OFFICE 1,960,568

METER YOKE

Norman H. Abrams, Waco, Tex., assignor to Dallas Foundry, Dallas, Tex., a corporation of Texas Application August 1, 1931, Serial No. 554,509

1 Claim. (Cl. 285—3)

This invention relates to meter settings and it has particular reference to new and useful improvements in a device for simplifying the incorporation of water and other types of meters in a pipe line and the principal object of the invention resides in the provision of a meter yoke whose particular construction permits it to be effectively and quickly mounted in a meter box, whether installed for riser settings, angle settings or straight line settings.

Another and equally as important object of the invention resides in the capability of the improved yoke, after having been set, of receiving the meter for operative installation without the aid of wrenches or tools of any character, which makes for extreme simplicity in mounting the meter and removing it for replacement, repair or for any other reason.

Still another object of the invention resides in the provision of a clamping means, which is a part of the yoke, the construction of which permits of secure mounting of the meter, prevents leakage and, as previously stated, can be accomplished without the aid of tools of any character.

Broadly, the invention comprehends the provision of an improved meter mounting which will enable the meter to be readily and quickly installed and removed or replaced by a nipple or a length of pipe without disturbing or interrupting the inlet and outlet pipes, thus insuring a continuation of service. Moreover, the invention seeks to provide, in addition to the novel advantages hereinbefore mentioned, a meter setting of extremely simple and economical construction which will reduce materially the cost of installation and maintenance of water meters.

With the foregoing objects as paramount, the invention has particular reference to its salient features of construction and arrangement of parts which will become manifest as the description proceeds, taken in connection with the accompanying drawing, in which Figure 1 is a side elevation of the improved meter yoke.

Figure 2 is a plan view thereof.

Figure 3 is a view on lines 3—3 of Figure 2.

Figure 4 is a vertical section of a meter box showing a straight line setting and illustrating the invention in its relationship with a water meter.

Continuing more in detail with the drawing, 1 designates the yoke which is preferably cast and supplied with a conventional reinforcing rib 2. The yoke terminates at one end into an expansion connection, while at the other end there is provided an interiorly threaded enlargement for receiving the threaded end of an outlet pipe 3. It is immaterial whether this outlet pipe is vertical or horizontal, since it is obviously possible to provide an elbow connection in the case of a right angular or vertical outlet pipe. This applies also to the inlet pipe 4, both the outlet and inlet pipes being shown in Figure 5 in horizontal position.

With further reference to the expansion connection, attention is directed to Figure 3 showing sleeve 5, integral with the yoke 1 and having a longitudinal bore in a plane to receive the end of the inlet pipe 4. The sleeve 5 receives for sliding and rotative movement a tube 6 having an enlarged end 7, which extends inwardly of the yoke and is provided with an annular recess 8 for the reception of a packing washer 9. The opposite end of the pipe 6 is snugly embraced by a packing ring 10, reposing in an annular recess in the sleeve 5 and is compressed by an interiorly and exteriorly threaded nut 11, which nut has a wrench receiving surface by which it may be threaded upon the end of the inlet pipe 4. It is understood however, that in most cases, the yoke is intended to be a permanent fixture when once installed in the meter box 12, although the meter 13 may be removed and replaced as many times as may be necessary without disturbing any of the elements of the invention.

A semi-spiral slot 14 is made in the sleeve 5, through which passes a bolt 15, which latter is threaded into the pipe 6, which may be hereinafter termed as a core and is so defined in the claims.

Referring to the opposite end of the yoke, it will be noted that an annular recess 16 is formed on the inside of the sleeve 17 to receive a packing washer 18, which corresponds with the washer 9 and the enlargement 7 of the core 6. The sleeve 17 is interiorly threaded as indicated at 19 to receive the outlet pipe 3 mentioned previously and shown in Figure 5. An advantageous feature of the sleeve 17 resides in the fact that the reinforcing fins or ribs 2 continue to the approximate axis of the sleeve, thereby affording a shelf or shoulder 20, upon which the outlet pipe 21 of the meter may rest, thereby assuming part of the weight of the meter and corresponds with the depth of the annular recess 8 directly opposite which receives and retains the inlet pipe of the meter. This is simplified in Figure 5.

The foregoing description deals with the structural details of the preferred form of the invention shown in Figures 1 to 3 inclusive and in Figure 5. The manner in which the meter 13 is installed will be presently explained.

It has been previously stated that the inlet and outlet pipes 3 and 4 may enter the box 12 in any manner without requiring any alterations in the structure of the invention.

The yoke 1 is installed in the manner shown in Figure 5 so that the ends of the pipes 3 and 4 will be in perfect alinement and so that the expansion connection may be readily accessible through the meter box cover 21. The yoke is thus permanently installed in the line.

In setting the meter 13, it is simply necessary to place the meter so that its pipes will be in register with the passages through the pipe 6 and the sleeve 17 directly opposite in the manner shown in Figure 5. This being done, the bolt or pin 15 is moved in the semi-spiral slot 14, which action obviously advances the pipe 6, causing the end of the meter pipe to be received in the recess 8 against the packing washer 9. The opposite or outlet pipe 21 of the meter 13 being in register with the opening through the sleeve 17, due to the fact that it reposes on the shoulder 20, is likewise advanced against the packing washer 18 and the meter is thus held securely in position. Due to the presence of the packing washers 9 and 18 and the packing gland 10, the possibility of leakage at any of the joints is positively eliminated. It is quite possible to secure the meter in position without the aid of any tool but if a great deal of tension is desired, a small piece of pipe may be inserted over the bolt or pin 15 to supply the desirable amount of leverage for tightening the expansion joint or breaking it for the removal of the meter.

It will be further understood that the invention is not limited to the specific arrangement of parts in their specific relationship shown in the drawing and described in the foregoing and that certain minor changes and modifications may be resorted to from time to time as may be considered necessary, without departing from the spirit or intent of the invention as set forth in the following claim.

What is claimed is:

An expansion connection for meter yokes including in combination a U-shaped member having an integral, interiorly threaded collar on one end to receive a meter connection, said collar having an annular recess therein arranged to receive a packing washer, an integral collar carried by the other end of said U-shaped member and having a spiral bayonet slot therein, a sleeve within said latter collar and slidable lengthwise therein, a pin threaded into said sleeve and extending outwardly through said spiral bayonet slot in said collar, an enlarged end on said sleeve, said end having an annular recess arranged to receive a second packing washer, and means held normally under compression within said second collar and embracing said sleeve whereby to prevent passage of fluid between said collar and said sleeve.

NORMAN H. ABRAMS.